United States Patent [19]

Mühleck et al.

[11] Patent Number: 5,664,459
[45] Date of Patent: Sep. 9, 1997

[54] ROLLING-MEMBER WORM-DRIVE

[75] Inventors: Martin Mühleck, Ebenhausen; Horst Altrock, Hambach, both of Germany

[73] Assignee: Deutsche Star GmbH, Schweinfurt, Germany

[21] Appl. No.: 530,000

[22] Filed: Sep. 19, 1995

[30] Foreign Application Priority Data

Mar. 21, 1995 [DE] Germany ................. 295 04 812.3

[51] Int. Cl.⁶ ........................................ F16H 25/22
[52] U.S. Cl. ............................. 74/424.8 R; 74/459
[58] Field of Search ................... 74/424.8 R, 459

[56] References Cited

U.S. PATENT DOCUMENTS

| 2,425,938 | 8/1947 | Hoover ................................ 74/459 |
| 3,512,426 | 5/1970 | Dabringhaus ........................ 74/459 |
| 4,070,921 | 1/1978 | Arnold ................................ 74/459 |
| 4,211,125 | 7/1980 | Benton ........................... 74/424.8 R |
| 4,357,838 | 11/1982 | Blaurock et al. ............... 74/424.8 R |
| 4,864,883 | 9/1989 | Mayfield ....................... 74/424.8 R |
| 5,373,755 | 12/1994 | Rohlinger .......................... 74/459 |

FOREIGN PATENT DOCUMENTS

| 0326657 | 8/1989 | European Pat. Off. |
| 0563512 | 10/1993 | European Pat. Off. |
| 1129792 | 5/1962 | Germany . |
| 2355844 | 6/1974 | Germany . |
| 2437497 | 12/1975 | Germany . |
| 2715761 | 10/1977 | Germany . |
| 2914756 | 10/1980 | Germany . |
| 4039573 | 6/1992 | Germany . |

*Primary Examiner*—Charles A. Marmor
*Assistant Examiner*—Troy Grabow
*Attorney, Agent, or Firm*—Brumbaugh, Graves, Donohue & Raymond

[57] ABSTRACT

A rolling-member worm-drive (10) comprises a spindle and a nut element (12) surrounding the spindle, where the spindle and the nut element (12) between them establish a helical rolling-member screw path, where in addition this rolling-member screw path is completed by an axial rolling-member return path, contained in the nut member, to a closed rolling-member circulation path in which an endless row of rolling-members travels, where in addition two rolling-member diverting elements (26) are arranged on the nut element (12) for transfer of the rolling-members between the rolling-member screw path and the rolling-member return path and between the rolling-member return path and the rolling-member screw path, and where at least one of the rolling-member diverting elements (26) is held on the nut member (12) by means of a securing element (36). In the rolling-member worm-drive according to the invention, the securing element is a securing ring (36) designed physically separate from the rolling-member diverting element (26).

34 Claims, 6 Drawing Sheets

5,664,459

ROLLING-MEMBER WORM-DRIVE

BACKGROUND OF THE INVENTION

The invention concerns a rolling-member worm-drive, comprising a spindle having an axis and an outer peripheral surface and a nut element having an inner peripheral surface surrounding the spindle, where at least one nut groove with two end regions, guiding rolling-members and running helically about the axis, is formed in the inner peripheral surface, which groove, together with the outer peripheral surface of the spindle, defines a helical rolling-member screw path running between the two end regions, where in addition this rolling-member screw path is completed by a rolling-member return path running between the two end regions to a closed rolling-member circulation path, where in addition the rolling-member circulation path is occupied by an endless row of rolling-members lying, on the one hand, in the nut groove and, on the other, on a helical race of the outer peripheral surface, each rolling-member being in a ready-to-roll condition, where in addition a rolling-member diverting element is arranged on the nut element in each of the end regions for transfer of the rolling-members between the rolling-member screw path and the rolling-member return path and between the rolling-member return path and the rolling-member screw path, and where the rolling-member diverting element is held on the nut element by means of a securing element.

STATEMENT OF THE PRIOR ART

Such a rolling-member worm-drive is disclosed, for example, in DE 29 14 756 C2. In this rolling-member worm-drive the diverting elements are bolted onto the nut element by means of screw bolts. The known rolling-member worm-drive is widely used and has proven to be outstanding in practice. However, in assembly of the rolling-member worm-drive bolting of the diverting elements to the nut element is found to be too onerous.

In addition, fastening of the diverting element to the nut element by means of a screw bolt is disclosed in German Patent 24 37 497.

EP 0 326 657 B1 discloses a nut element which is made essentially of two nested sleeves. A rolling-member diverting element is set into each terminal recess of the inner sleeve. The inner sleeve with inset diverting elements is held on the outer sleeve by annular elements which are screwed on.

To simplify fastening, a rolling-member diverting element designed with a supporting ring integrally formed has been used in practice. To fix the diverting element to the nut element, the supporting ring is arranged in a groove. However, the rolling-member diverting element with a supporting ring integrally formed has the disadvantage that the ring, consisting of synthetic material, after being subjected to high temperature due, for example, to unintended overheating of the rolling-member worm-drive, changes its dimensions, particularly its diameter. After the rolling-member worm-drive cools down to normal operating temperature again the change in dimensions of the supporting ring may result in play of the supporting ring in the groove on the nut element and thus the diverting element can no longer be fixed on the nut element with the required precision. This effect shows up clearly especially in rolling-member worm-drives of great spindle diameter.

OBJECT OF THE INVENTION

In contrast, the object of the invention is to provide a rolling-member worm-drive wherein, under all operating conditions which may take place, precise fixing of the rolling-member diverting element on the nut element, simultaneously with simple fastening on the nut element, is always reliably secured.

SUMMARY OF THE INVENTION

According to the invention, this object is accomplished in that the securing element is a securing ring designed physically separate from the rolling-member diverting element, preferably a segment spring ring. Any play of the rolling-member element occurring in operation of the rolling-member worm-drive, whether because of dimensional changes owing to the effect of temperature or for any other reason, can be reliably compensated for by the securing ring. In addition, fastening by means of a securing ring designed physically separate represents an especially low-cost type of fastening. Locking rings or segment spring rings are commercially available and widely distributed structural components which can be obtained on the market in a great plurality of sizes at a low price.

When the securing ring is mounted with elastic preload and by this preload presses the rolling-member diverting element against the nut element in axial and/or radial direction, the diverting element, in operation of the rolling-member worm-drive, can thus be fixed relative to the nut element in all its degrees of freedom. Namely, in peripheral direction the diverting element is already pressed against the nut element under the effect of the circulating rolling-members rerouted by it.

In order to make the rolling-member worm-drive especially resistant to thermal stresses appearing in operation, it is proposed that the securing ring be made of a material that is more resistant to thermal deformation than the material of the diverting element. The securing element, for example, may be made of metal. The diverting element, for example, may be made, preferably injection molded, of synthetic material. However, of course other suitable materials may alternatively be used.

Part of the fixation of the rolling-member diverting element on the nut element can be assumed by the nut element itself when a recess in which the diverting element is accommodated is formed on the said nut element.

The securing element can be fastened on the nut element in especially simple fashion when it can be snapped into a securing groove formed on the nut element. Here, the securing groove can cut into the accommodating recess for the rolling-member diverting element.

To obtain axial and radial preloading of the rolling-member diverting element against the nut element, it is proposed in an embodiment of the invention that a contact surface inclined with respect to the axial direction of the spindle as well as with respect to a plane orthogonal to this axial direction be provided on the securing element and/or the diverting element.

In this connection, the contact surface preferably is inclined so that the rolling-member diverting element, owing to preloading of the securing element, is forced radially outward, i.e., toward the floor of the nut groove. The contact surface preferably encloses an acute angle with the plane orthogonal to the axial direction. In addition, the contact surface may be part of a conical surface. However, it should be emphasized that it must always be made certain that the diverting element is preloaded in axial direction by the securing element.

In a first alternative refinement of this embodiment, a contact surface inclined with respect to the axial direction of the spindle as well as with respect to a plane orthogonal to this axial direction, which cooperates with an optionally chamfered peripheral edge of the securing element, may be provided on the diverting element.

In a second alternative refinement, a contact surface inclined with respect to the axial direction of the spindle as well as with respect to a plane orthogonal to this axial direction, which cooperates with an optionally chamfered contact edge of the rolling-member diverting element, may be provided on the securing element.

In a third alternative refinement of this embodiment, it is proposed that a contact surface inclined with respect to the axial direction of the spindle as well as with respect to a plane orthogonal to this axial direction, which cooperates with a correspondingly inclined contact countersurface that is formed on the securing element, be provided on the rolling-member diverting element.

In all three of the alternative refinements indicated above the desired preloading of the diverting element can be obtained in axial direction as well as in radial direction. In the third alternative refinement, the diverting element and the securing element, upon a relative motion of these two parts, slide on one another by means of the contact surface and the contact counter-surface, which permits especially low-wear cooperation of these two parts. In this connection, a spring ring preferably is used as the securing element, since spring rings with a beveled surface, which can cooperate as a contact countersurface with a contact surface formed on the diverting element, are readily obtainable in commerce.

In addition or alternatively, in another embodiment an oblique surface inclined with respect to the axial direction of the spindle as well as with respect to a plane orthogonal to this axial direction can be provided on the securing element and/or the nut element. In this connection, the oblique surface can enclose an acute angle with the plane orthogonal to the axial direction and/or may be part of a conical surface. Such an oblique surface, upon a relaxation motion of the securing element, can provide an additional force component at least in axial direction, which aids in fixing the rolling-member diverting element on the nut element.

In a first alternative refinement of this additional embodiment, it is provided that the oblique surface is provided on the nut element, preferably in the region of a securing groove for accommodating the securing element, and cooperates with an optionally chamfered peripheral edge of the securing element.

In a second alternative refinement of this additional embodiment it is proposed that the oblique surface be provided on the securing element and cooperate with an optionally chamfered edge of the nut element.

In a third alternative refinement of this additional embodiment, the oblique surface can be provided on the nut element, preferably in the region of a securing groove for accommodating the securing element, and cooperate with a correspondingly inclined oblique countersurface which is formed on the securing element.

An additional force component may be provided by means of all three alternative refinements. Because the oblique surface and the oblique countersurface slide on one another upon motion of the securing element relative to the nut element, the third alternative refinement is characterized by particularly low wear.

The fixation of the rolling-member diverting element in radial and peripheral direction can be improved in that the diverting element has at least one supporting projection pointing essentially in the axial direction of the spindle. In this connection, the nut element may be designed with at least one supporting recess for the supporting projection.

Especially secure fixation of the rolling-member diverting element on the nut element in radial and peripheral directions can be obtained when the supporting projection is capable of form-locking insertion into the supporting recess.

More compact design of the rolling-member diverting element can be obtained in that the supporting projection at least partially surrounds a rolling-member outlet of the diverting element pointing in the axial directions of the spindle. However, it is alternatively possible to provide at least one supporting projection which is arranged at some distance from a rolling-member outlet of the diverting element pointing in the axial direction of the spindle.

A supporting projection with a substantially crescent-shaped cross section, taken orthogonal to the axial direction, because of this cross sectional shape, can protect the diverting element from unintended tilting. As a result of such tilting, steps may form between the rolling-member return channel and the rolling-member diverting element which interfere with transfer of the rolling-members and lead, for example, to the development of undesirable noise.

An especially high degree of protection against tilting can be ensured in that at least two supporting projections are provided.

In particular, the rolling-members may be balls. However, the possibility of using rollers, needles or cylinders as rolling-members is not excluded.

A sealing groove for the accommodation of a sealing element, preferably a sealing ring, preferably is formed on the nut element in order to prevent the escape of lubricant from the rolling-member worm-drive and the penetration of dirt into the rolling-member worm-drive.

When the diverting element has a rolling-member deflecting nose, which facilitates transfer between the rolling-member screw path and the rolling-member return path, particularly low-wear and low-noise operation of the rolling-member worm-drive is obtained. In this connection, it may be provided that the rolling-member deflecting nose be designed as a lubricant wiper and rest on the raceway of the outer peripheral surface of the spindle. In this case, the rolling-member deflecting noses as lubricant wipers may assume a major part of the function of a seal against the escape of lubricant from the rolling-member worm-drive, so that the sealing element can be designed with special consideration of the prevention of entry of dirt into the rolling-member worm-drive.

According to a further aspect, the invention concerns a rolling-member worm-drive of the type described at the beginning wherein the diverting element has at least one supporting projection pointing essentially in the axial direction of the spindle, the nut element is designed with at least one supporting recess for the at least one supporting projection and the supporting projection is capable of form-locking insertion into the supporting recess so that substantially unhindered transfer of the rolling-members from the diverting element into the rolling-member return path and from the return path into the diverting element is provided. The rolling-member diverting element of this rolling-element worm-drive is characterized by an especially compact shape, as well as trouble-free and low-noise operation. With regard to additional design possibilities of the at least one supporting projection and the advantages obtained by these designs, reference is made to the discussion above.

In addition, the invention concerns a method for the production of a group of rolling-member worm-drives of the type described at the beginning, where the group members of the rolling-member worm-drive group have rolling-member screw paths with unlike screw diameters in each instance and where at least one nut element for each group member of the rolling-member worm-drive group and at least one spindle for each group member of the rolling-member worm-drive group are provided in the method. To simplify production of the group of rolling-member worm-drives and to simplify the manufacturer's storekeeping, the method according to the invention in addition comprises these steps:

providing at least one securing ring designed physically separate from the respective rolling-member diverting element, a segment securing ring if desired, for each group member of the rolling-member worm-drive group, as securing element;

providing at least a number of identically designed rolling-member diverting elements corresponding to the number of group members of the rolling-member worm-drive group;

providing at least a plurality of identically designed rolling-members corresponding to the number of group members of the rolling-member worm-drive group;

assembling the group members of the group of rolling-member worm-drives, where each of the group members is assembled using the specific parts for this group member, namely nut element, spindle and securing ring, as well as using one of the identically designed rolling-member diverting elements and a plurality of identically designed rolling-members.

Lastly, the invention likewise concerns a method for assembly of a rolling-member worm-drive having these steps:

assembling the nut element with a rolling-member diverting element using a securing ring designed physically separate from the diverting element, in particular a segment securing ring, as securing element;

checking the accuracy of fit of the transition between rolling-member diverting element and rolling-member return path as well as between rolling-member screw path and rolling-member diverting element;

if necessary, detaching the rolling-member diverting element from the nut element with non-destructive removal of the securing ring, reworking of nut element and/or diverting element and reassembling nut element and diverting element using the securing ring previously removed; and repeating detaching, reworking and reassembling until the desired accuracy of fit has been obtained.

In this connection, it is essential that the securing ring can again be non-destructively removed from the securing groove of the nut element. The diverting piece naturally is not damaged in such removal of the segment ring. This possibility of non-destructive disassembly of the segment ring leads to substantial ease of assembly of the rolling-member worm-drive. The same diverting piece and the same segment ring as in the initial assembly can be used in the following repeat assembly of the rolling-member worm-drive, so that the total scrap produced in assembly is limited to the shavings produced in reworking of the nut member and/or of the rolling-member diverting element.

The various features of novelty which characterize the invention are pointed out with particularity in the claims annexed to and forming part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The design and function of the rolling-member worm-drive according to the invention will be described in detail below, by examples of a ball worm-drive, with the aid of the accompanying drawings wherein

FIGS. 4a and 4b are two perspective views of the diverting piece, where the diverting piece according to FIG. 4b is turned 180° about its vertical axis starting from its position according to FIG. 4a;

DETAILED DESCRIPTION OF PREFERRED EMBODIMENTS

Figure 1:
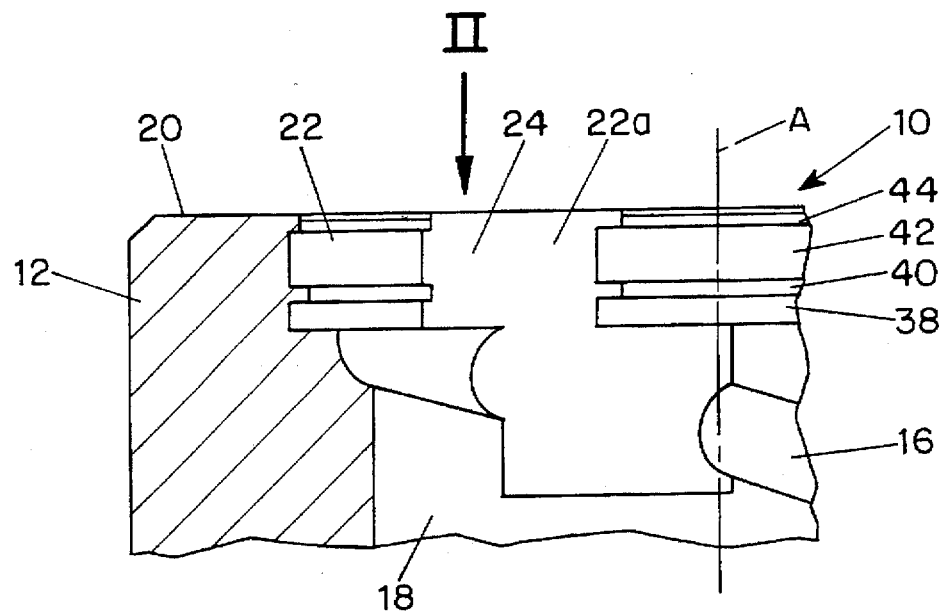
FIG. 1 shows a longitudinal section through the nut element of the ball worm-drive without spindle, diverting piece and balls, along the line I—I in FIG. 2.
Figure 2:
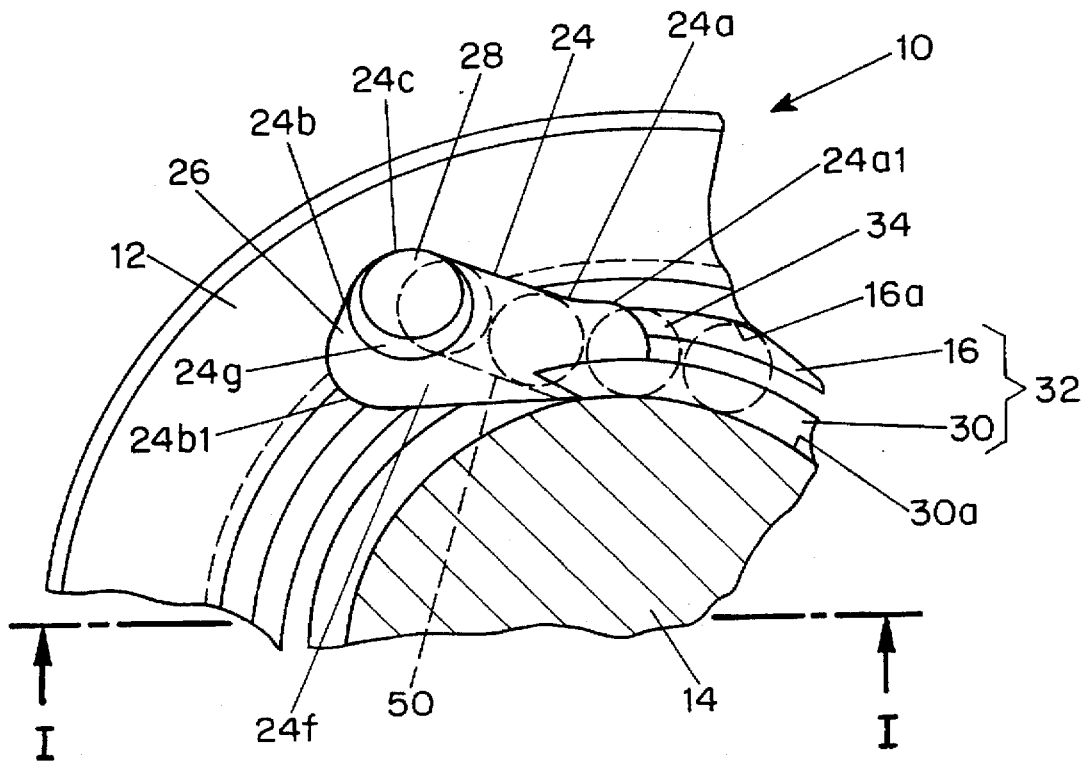
FIG. 2 is an end view of the ball worm-drive according to FIG. 1, but with spindle, diverting piece and balls in arrow direction II of FIG. 1.

FIGS. 1 and 2 show a ball worm-drive, labeled generally 10, which comprises a nut element 12 and a spindle 14 (see FIG. 2). The nut element 12 has a groove 16, running helically, of substantially semicircular cross section in its inner peripheral surface 18. Adjacent to one end face 20 a shaped recess 22, the design of which will be explained in detail below, is formed in the inner peripheral surface 18. From the end face 20 an accommodating recess 24 is set into the nut element 12, which cuts into the shaped recess 22 at 22a (see FIG. 1). A diverting piece 26 is set into the accommodating recess 24 (see FIG. 2). The fastening of this diverting piece 26 in the accommodating recess 24 of the nut element 12 will be gone into in detail below. The diverting piece 26 preferably is made as an injection-molded part of synthetic material. However, other suitable materials and manufacturing methods are likewise usable.

The outer contour of the accommodating recess 24 can be seen in FIG. 2. A first delimiting surface 24a, parallel to the axis A (see FIG. 1) of the spindle 14, begins by means of a rounded outlet 24a1 on the inner peripheral surface 18 of the nut element 12 and from this outlet 24a1, starting from its initially essentially tangential extension in FIG. 2, bends off upward into the nut element 12. A second delimiting surface 24b opens through a rounded section 24b1 into the inner peripheral surface 18 of the nut element 12. The first delimiting surface 24a and the second delimiting surface 24b run into one another through a rounded section 24c.

In the region of the rounded section 24c, an axially directed ball-return channel 28 opens into the accommodating recess 24. The nut groove 16, running helically, and a spindle groove 30, running correspondingly helically, together form a ball screw path 32. The ball screw path 32 and the axial return channel 28 together form a closed ball circulation path 28/32, in which an endless row of balls 34 (shown dashed in FIG. 2) circulates.

To fix the diverting piece 26 in the accommodating recess 24 of the nut element 12 a preferably metallic segment spring ring 36 is provided, which can be snapped into an annular groove 38 of the nut element 12. The annular groove 38 is part of the shaped recess 22 of the nut element 12. The recess 38 is separated by means of an annular projection 40 from an additional annular groove 42 of the recess 22 near the end face 20. The additional annular groove 42 is limited toward the end face 20 by means of an annular projection 44. The annular grooves 38, and 42 cut into the accommodating recess 24 at 22a. The additional annular groove 42 is designed for the accommodation of a sealing element (not represented), which serves to retain lubricant contained in the ball worm-drive 10 in the latter and to prevent the entry of contaminants into the ball worm-drive 10.

Figure 3:
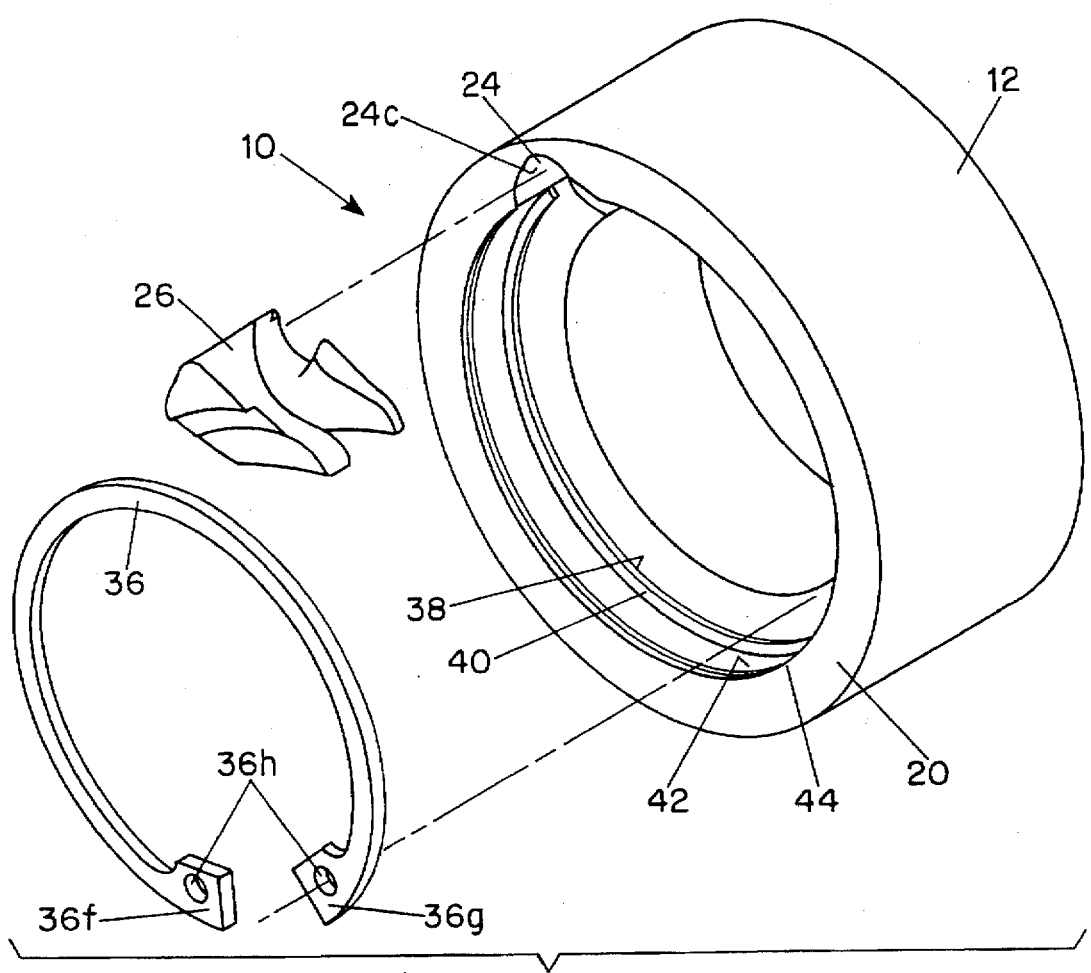
FIG. 3 is an exploded perspective view of nut element, diverting piece and securing ring of the ball worm-drive.
Figure 4A:
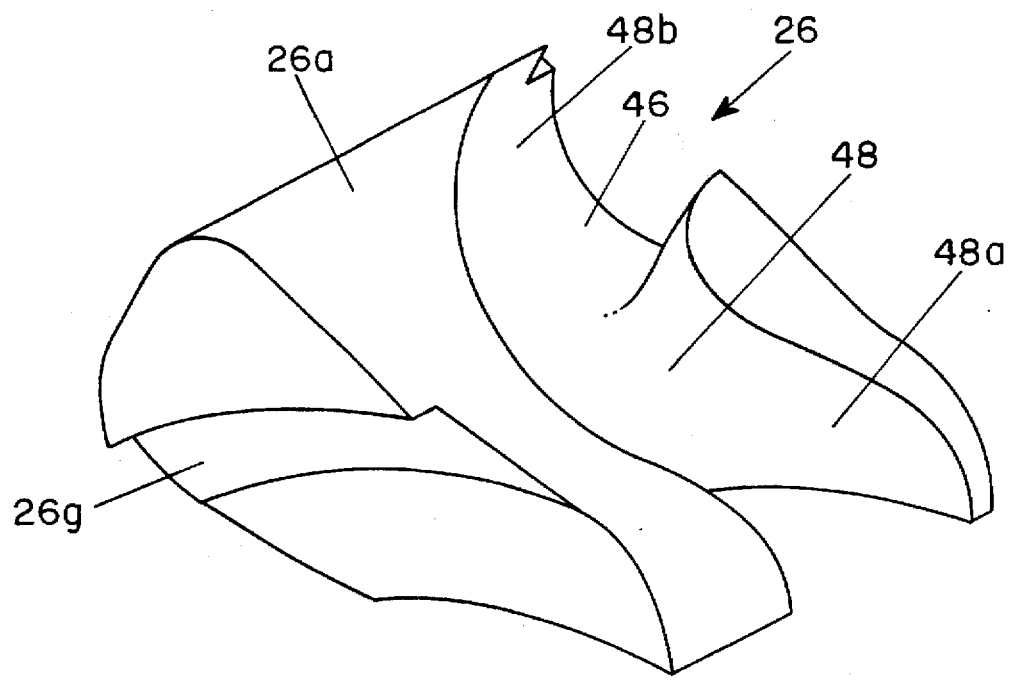
Figure 4B:
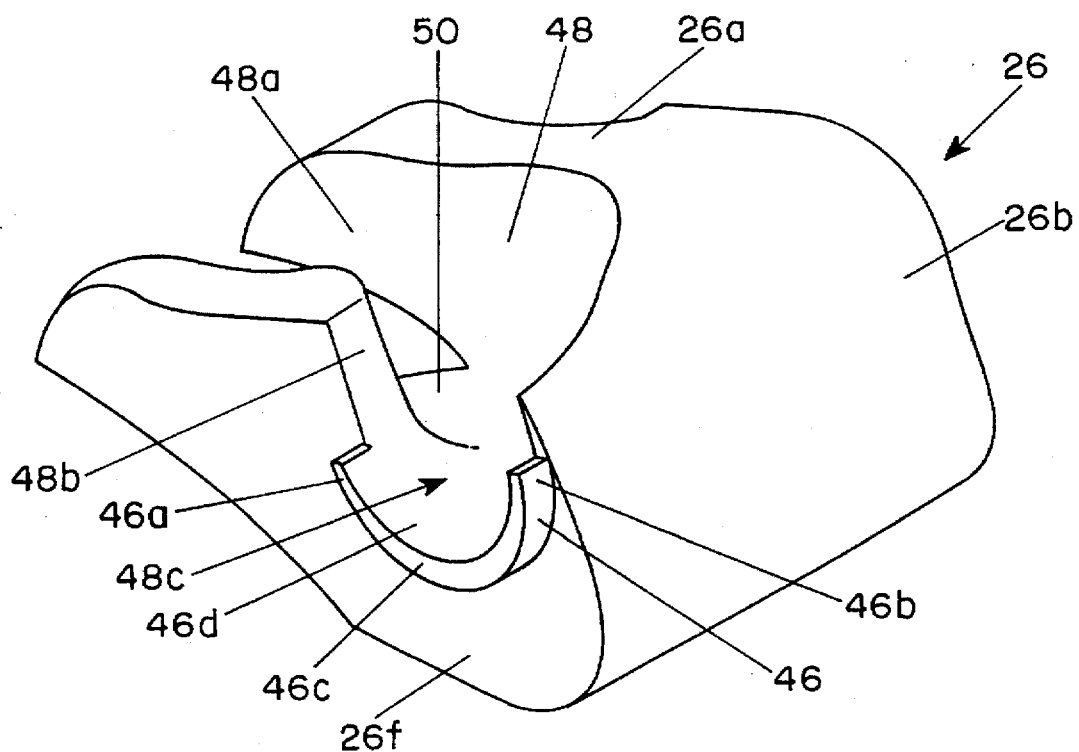

The diverting piece 26 is shown enlarged in FIGS. 4a and 4b. The diverting piece 26 in FIG. 4a is seen in the same viewing direction as in FIG. 3. FIG. 4b shows the diverting piece turned 180° about its vertical axis starting from its position according to FIG. 4a.

The diverting piece has a first contact surface 26a for seating on the first delimiting surface 24a of the accommodating recess 24 and a second contact surface 25b for seating on the second delimiting surface 24b of the accommodating recess 24. A front contact surface 26f of the diverting piece 26 is designed for seating on the axial delimiting surface 24f of the accommodating recess 24 surrounding the discharge opening of the ball-return channel 28.

From the first contact surface 26a, a ball-deflecting channel 48 is set into the diverting piece 26 which is composed of a tangential straight piece 48a and a curved piece 48b, where the curved piece 48b deflects the balls 34 more than 90°. At the end of the straight piece 48a distant from the curve, said straight piece 48a is delimited from the spindle groove 30 by a deflecting nose 50 formed on the diverting piece 26 (see FIGS. 2 and 4b). The deflecting nose 50 engages in the spindle groove 30 until near the bottom 30a of the spindle groove (see FIG. 2), in order to move the balls 34 coming from the last pitch of the spindle groove 30 out of this last pitch and guide them into the diverting channel 48. There, the balls 34 remain in contact with the material of the nut element 12, since the diverting channel 48 of the diverting piece 26 is open toward the first contact surface 26a. The balls 34 thus run first on the bottom 16a of the nut groove 16 and then on the first delimiting surface 24a of the accommodating recess 24. However, embodiments in which the balls in this region of their circulation path are not in contact with the nut element, but are guided solely by the diverting piece, are alternatively conceivable.

In the region of the contact surface 26f of the diverting piece 26, on the axial delimiting surface 24f of the accommodating recess 24, the diverting piece 26 has a supporting projection 46, preferably integrally formed. The supporting projection 46 surrounds an outlet opening 48c, pointing in the axial direction A of the spindle 14, of the diverting channel 48 of the diverting piece 26 in its lower region. In the assembled state of the ball worm-drive 10 the supporting projection 46 comes to lie formlockingly in a suitably designed supporting recess 24g of the accommodating recess 24 surrounding the discharge of the ball-return channel 28. The diverting piece 26 is secured in the accommodating recess 24 in radial direction as well as in peripheral direction by the cooperation of the supporting projection 46 and the supporting recess 24g, where special care must be taken to see that the diverting channel 48 of the diverting piece 26 and the ball-return channel 28 of the nut element 12 run smoothly into one another, i.e., without transfer of the balls 34 being hindered by steps or the like.

Taken orthogonal to the axial direction A, the supporting projection 46 has a substantially crescent-shaped cross section, i.e., seen in peripheral direction, the supporting element 46 has a smaller cross section in its two end regions 46a and 46b than in its middle region 46c (cf. FIG. 4b). In the supporting projection 46 represented in the figures, each of the tips of the crescent is cut off in the end regions 46a and 46b.

The crescent shape of the supporting recess 24g may be obtained by, for example, machining the discharge region of the ball-return channel 28 by means of a face milling cutter moved in axial direction, where the face mill has a greater diameter than the ball-return channel 28 and is set up eccentric relative to its central axis. However, it is alternatively possible to introduce a surface milling cutter of a diameter identical to that of the ball-return channel into this ball-return channel and then move it in radial direction.

The inner delimiting surface 46d of the supporting projection 46 is constantly adjacent to the rolling surface of the curved piece 48b of the diverting channel 48 and so facilitates transfer of the balls 34 between the diverting channel 48 and the axial return channel 28 of the nut element 12.

The shape of the supporting projection 46 may be selected as desired, depending upon the type of rolling-members used in each instance.

Figure 5:
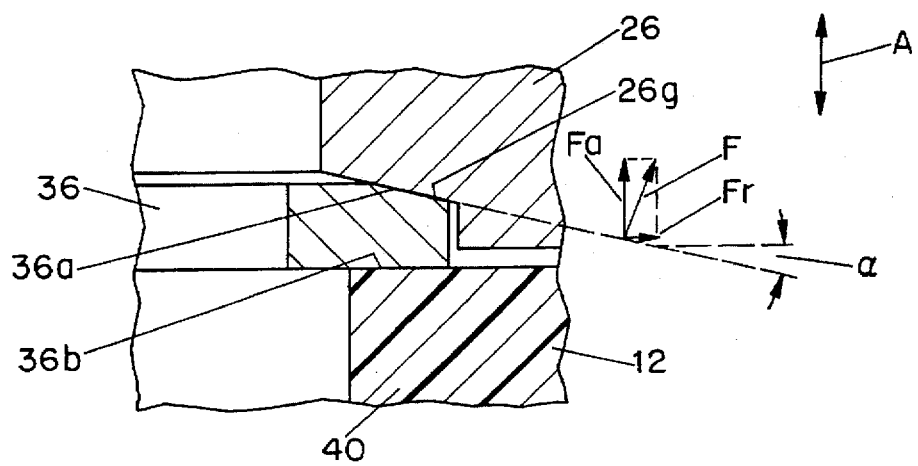
FIGS. 5 to 11 illustrate various possibilities of cooperation of nut element, securing ring and diverting piece.

The diverting piece 26 is held in the accommodating recess 24 by means of the segment spring ring 36 snapped into the annular groove 38. For this, the diverting piece 26, as may be seen for example in FIG. 5, is seated by a contact surface 26g inclined with respect to the axial direction A (see also FIG. 4a) on a correspondingly inclined contact surface 36a of the spring ring 36. Due to the inclination of the cooperating contact surface 26g and contact countersurface 36a of the diverting piece 26 and segment ring 36, the segment ring 36, seeking to expand, exerts a force F on the diverting piece 26 which has a component Fr pointing in radial direction and a component Fa pointing in axial direction A. Here, the radial force component Fr is directed radially outward, so that the deflecting nose 50 is forced away from the bottom 30a of the spindle groove 30 (cf. FIG. 2). The securing ring 36 is in addition supported by a surface 36b, orthogonal to the axial direction A, on the annular projection 40 of the nut element 12.

In the example illustrated, the spindle 14 is provided with a spiral groove 30, which together with the spiral groove 16 of the nut element 12 forms the ball race channel 28/32. However, it is alternatively conceivable that the spindle has a smooth cylindrical surface. This latter embodiment is used particularly in cases in which great axial forces need not be transmitted and exact positioning is not required. This system is especially inexpensive to manufacture and has the advantage that, in case of overload, overrun of the spindle is possible and thus an overload protection exists.

Figure 6:
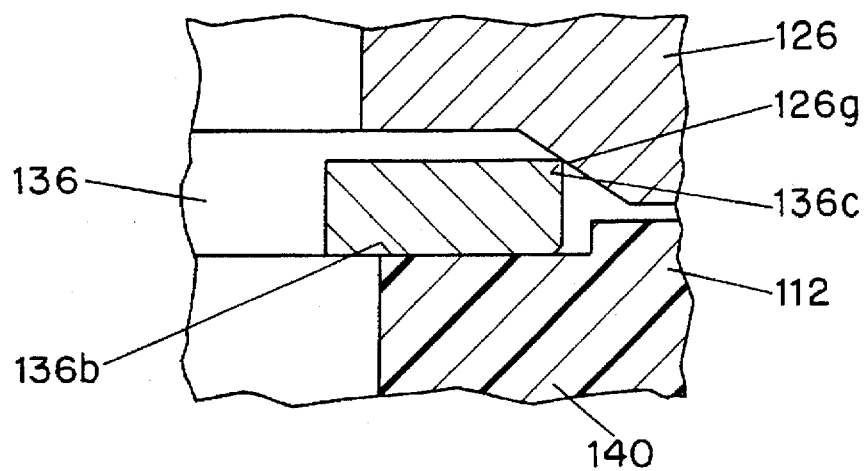

FIG. 6 shows another possibility of cooperation of securing ring and diverting piece, by which preloading of the diverting piece can be obtained in axial as well as in radial direction. The embodiment according to FIG. 6 corresponds substantially to the embodiment according to FIGS. 1 to 5. Therefore, in FIG. 6, analogous parts are labeled with the same reference numerals as in FIGS. 1 to 5 but increased by the number 100. In this embodiment, the securing ring 136 rests by a preferably chamfered peripheral edge 136c on the contact surface 126g of the diverting piece 126. The securing ring 136 is in addition supported, by a surface 136b orthogonal to the axial direction A, on the annular projection 140 of the nut element 112.

Figure 7:
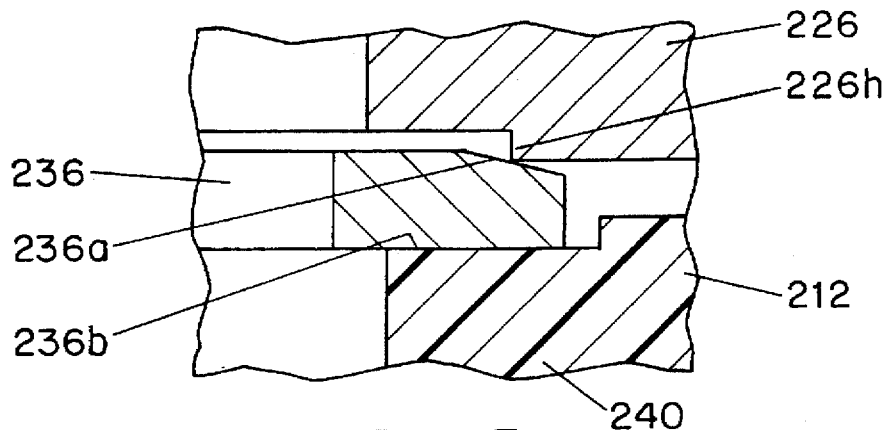

An additional embodiment, which corresponds substantially to the embodiment according to FIGS. 1 to 5, is represented in FIG. 7. Therefore, in FIG. 7, analogous parts are labeled with the same reference numerals as in FIGS. 1 to 5, but increased by the number 200. In this embodiment, the securing ring 236 rests by a contact surface 236a, inclined with respect to the axial direction A, on a preferably chamfered peripheral edge 226h of the diverting piece 226. The securing ring 236 is in addition supported by a surface 236b, orthogonal to the axial direction A, on the annular projection 240 of the nut element 212.

Figure 8:
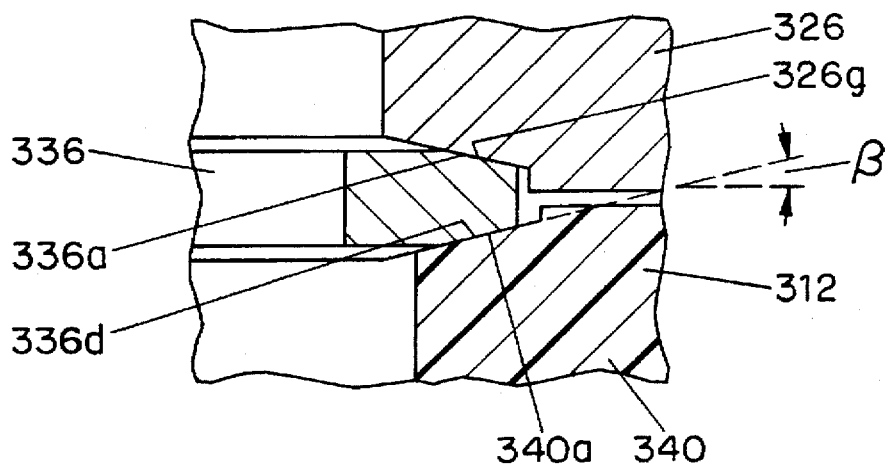

Another embodiment, which corresponds essentially to the embodiment according to FIGS. 1 to 5, is represented in FIG. 8. Therefore, in FIG. 8 analogous parts are labeled with the same reference numerals as in FIGS. 1 to 5, but increased by the number 300. In the embodiment according to FIG. 8, the securing ring 336 is designed with an oblique surface 336d on the face pointing to the nut element 312, as well as with the inclined surface 336a cooperating with the contact surface 326g of the diverting piece 326. This oblique surface 336d cooperates with a correspondingly inclined oblique countersurface 340a of the annular projection 340 and supports preloading of the diverting piece 326 in the axial direction A.

Figure 9:
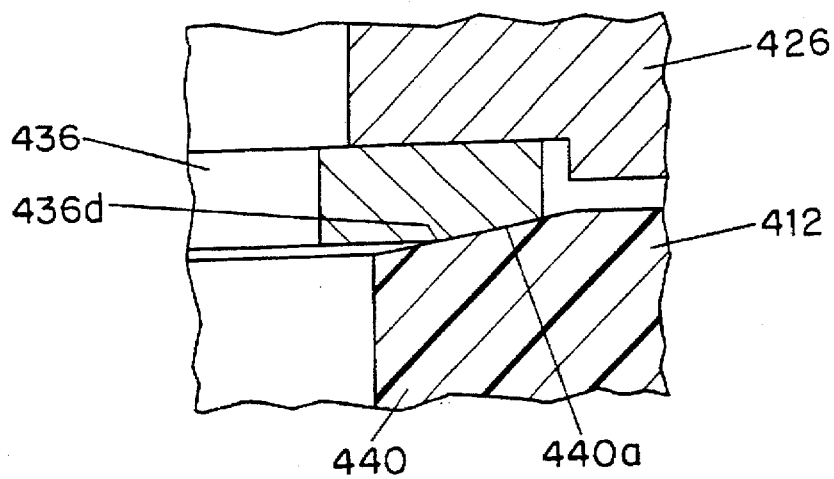

In the embodiment according to FIG. 9 the contact surfaces on the securing ring 436 and diverting piece 426, corresponding to the contact surfaces 336a and 326g of the embodiment according to FIG. 8, have been omitted. Only the oblique surfaces 436d on the securing ring 436 and 440a on the nut element 412, corresponding to the oblique surfaces 336d and 340a, are provided.

Figure 10:
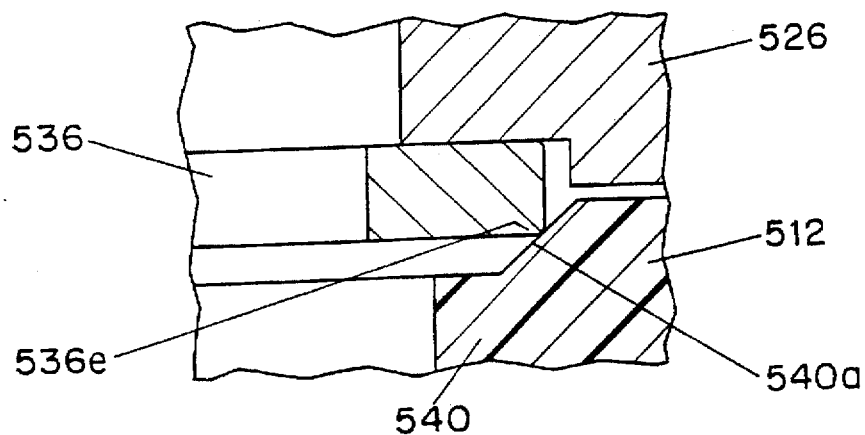

In the embodiment according to FIG. 10 preloading of the diverting piece 526 in axial direction A is supported by cooperation of an oblique surface 540a on the annular projection 540 of the nut element 512 with a preferably chamfered peripheral edge 536e of the securing ring 536.

Figure 11:
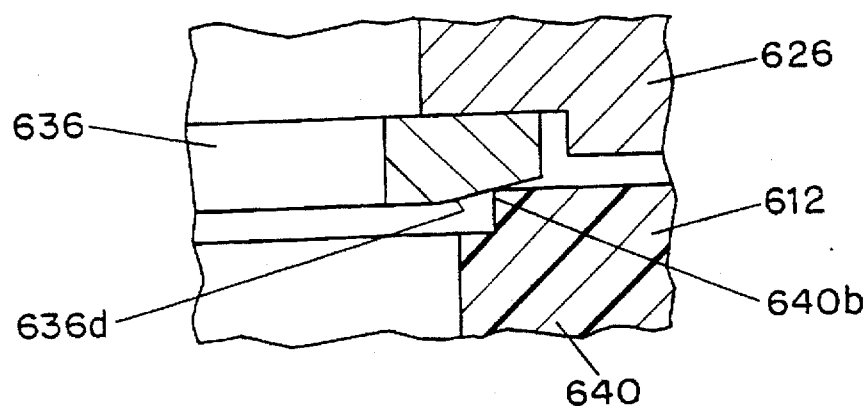

In the embodiment according to FIG. 11, analogous support of preloading of the diverting piece 626 in axial direction A is obtained by cooperation of an oblique surface 636d on the securing ring 636 with a preferably chamfered peripheral edge 640b on the annular projection 640 of the nut element 612.

Figure 12:
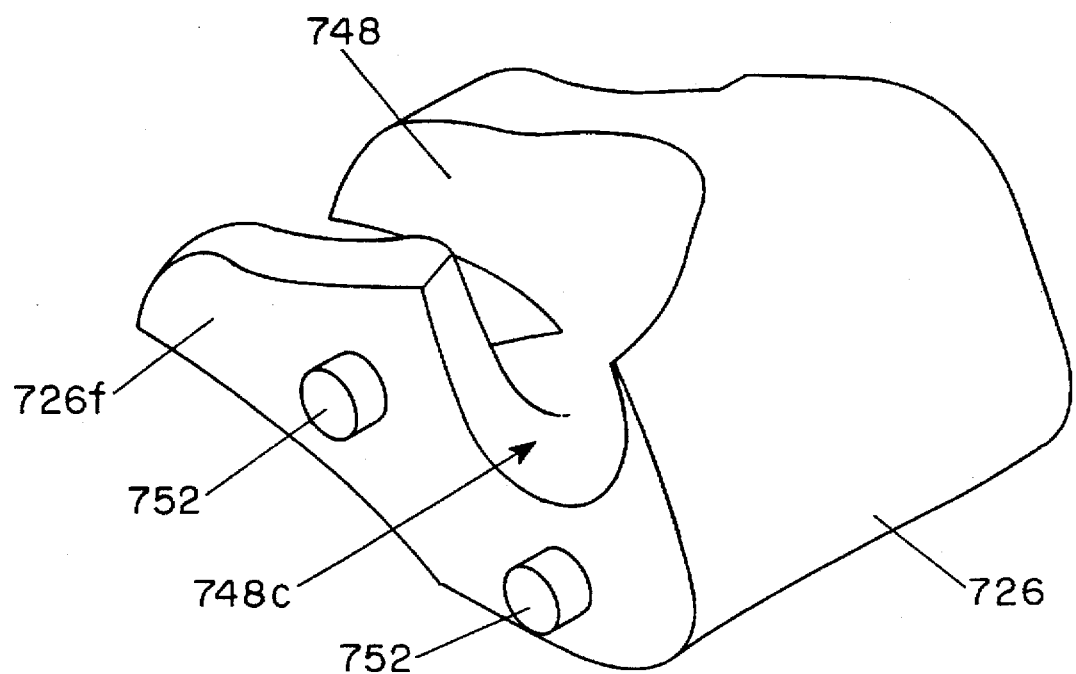
FIG. 12 a view similar to FIG. 4b of a variant of the diverting piece.
Figure 13:
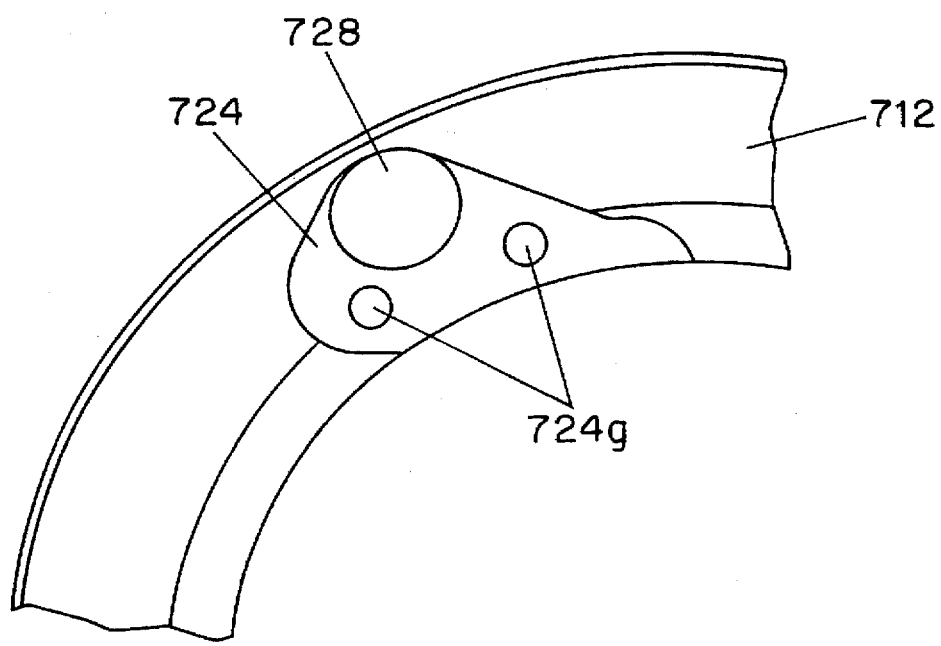
FIG. 13 is an end view of a nut member for use with the diverting piece designed according to FIG. 12, in a viewing direction corresponding to FIG. 2.

A variant embodiment of the ball worm-drive according to the invention, corresponding substantially to the ball worm-drive represented in FIGS. 1 to 5, is represented in FIGS. 12 and 13. Analogous parts therefore are labeled with the same reference numerals as in FIGS. 1 to 5, but increased by the number 700. The variant according to FIGS. 12 and 13 will be described below only insofar as it differs from the embodiment according to FIGS. 1 to 5, to the description of which reference otherwise may be expressly made.

Instead of a projection corresponding to the supporting collar 46 of the embodiment according to FIGS. 1 to 5, the diverting piece 726 has two supporting pins 752, which extend from the front contact surface 726f of the diverting piece 726 and in the assembled state of the ball worm-drive engage form-lockingly in corresponding supporting recesses 724g of the accommodating recess 724 of the nut element 712. Cooperation of the supporting pins 752 and the supporting recesses 724g ensures that the diverting piece 726 and the nut element 712 are properly fitted to one another so that the balls can pass unhindered from the ball-return channel 728 into the diverting channel 748 and vice-versa.

It must be added that the securing ring 36 again can be removed non-destructively from the securing groove 38 of the nut element 12. For this, the segment ring 36, according to FIG. 3, in the region of its free ends 36f and 36g in each instance has an engagement aperture 36h for a removal tool—for example, pliers. Of course, in such removal of the segment ring 36, the diverting piece 26 is not damaged either, and may be lifted out of the recess 24 after removal of the segment ring 36.

This possibility of non-destructive disassembly of the segment ring leads to substantial ease of assembly of the rolling-member worm-drive 10. First, the diverting piece 26 is set into the recess 24 and secured by means of the segment ring 36. Then, the accuracy of fit of the passage between the curved piece 48b of the ball diverting channel 48 of the diverting piece 26 and the ball-return channel 28 and between the straight piece 48a of the ball diverting channel 48 of the diverting piece 26 and the ball screw path is checked. If unevennesses, steps or other hindrances are found when this is done, the segment ring 36 and the diverting piece 26 can be disassembled non-destructively. To eliminate the disturbances detected, the nut element or the diverting piece, optionally even both parts, can now be reworked in simple fashion. The same diverting piece and the same segment ring as in the first assembly can be used in subsequent repeat assembly of the ball worm-drive. The above steps of assembly, checking, non-destructive disassembly and reworking are repeated until the desired result is obtained upon checking.

The physically separate design of diverting piece and securing ring has the additional advantage that identical diverting pieces can be used for producing worm-drives of unlike size, for example of unlike spindle diameter. Adaptation to the respective size of nut element and spindle of the worm-drive to be assembled in each instance is effected solely by selection of a suitable securing ring. The various types of worm-drives offered by a manufacturer accordingly can be divided into a plurality of groups of worm-drives, where for assembly of the group members of such a worm-drive group, i.e., assembly of the worm-drives belonging to one and the same worm-drive group, identical diverting pieces are used in each instance. For assembly of worm-drives belonging to unlike worm-drive groups, on the other hand, unlike diverting pieces are used.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A rolling-member worm drive, comprising:

a spindle having an axis (A) and an outer peripheral surface, a nut element having an inner peripheral surface surrounding said spindle, at least one nut groove formed in an inner peripheral surface of said nut element and including two end regions and helically running about the axis (A), said nut groove, together with a helical race on said outer peripheral surface of said spindle, defining a helical rolling-member screw path running between the two end regions;

a rolling-member return path running between the two end regions and constituting, together with said rolling-member screw path, a closed rolling-member circulation path;

an endless row of rolling-members arranged in said rolling-member circulation path and lying in said nut groove and on said helical race;

a rolling-member diverting element arranged on said nut element in each of the two end regions for transfer of the rolling members between said helical rolling-member screw path and said rolling-member return path and between said rolling-member return path and said rolling-member screw path;

at least one of the rolling-member diverting elements being held on said nut element by means of a securing ring designed separately from said rolling-member diverting element; and a contact surface provided on the securing ring and/or the rolling-member diverting element and inclined with respect to the axial direction (A) of the spindle as well as with respect to a plane orthogonal to said axial direction.

2. The rolling-member worm drive according to claim 1, wherein the contact surface is inclined so that the rolling-member diverting element, owing to preloading of the securing ring, is forced in the axial direction (A) as well as radially outward.

3. The rolling-member worm drive according to claim 1, wherein the contact surface encloses an acute angle ($\alpha$) with the plane orthogonal to the axial direction (A).

4. The rolling-member worm drive according to claim 1, wherein the contact surface is part of a conical surface.

5. The rolling-member worm drive according to claim 1, wherein the contact surface is provided on the rolling-member diverting element and cooperates with a peripheral edge of the securing ring.

6. The rolling-member worm drive according to claim 1, wherein that the contact surface is provided on the securing ring and cooperates with a chamfered contact edge of the rolling-member diverting element.

7. The rolling-member worm drive according to claim 1, wherein the contact surface is provided on the rolling-member diverting element and cooperates with a correspondingly inclined contact countersurface that is formed on the securing ring.

8. A rolling-member worm drive, comprising:

a spindle having an axis (A) and an outer peripheral surface;

a nut element having an inner peripheral surface surrounding the spindle;

at least one nut groove formed in an inner peripheral surface of said nut element and including two end regions and helically running about the axis (A), said nut groove, together with a helical race on said outer peripheral surface of said spindle, defining a helical rolling-member screw path running between the two end regions;

a rolling-member return path running between the two end regions and constituting, together with said rolling-member screw path, a closed rolling-member circulation path;

an endless row of rolling-members arranged in said rolling-member circulation path and lying in said nut groove and on said helical race;

a rolling-member diverting element arranged on said nut element in each of the two end regions for transfer of the rolling-members between said helical rolling-member screw path and said rolling-member return path and between said rolling-member return path and said rolling-member screw path;

at least one of the rolling-member diverting elements being held on said nut element by means of a securing ring designed separately from said rolling-member diverting element; and an oblique surface provided on the securing ring and/or the nut element and inclined with respect to the axial direction (A) of the spindle as well as with respect to a plane orthogonal to said axial direction.

9. A rolling-member worm drive according to claim 8, wherein the oblique surface encloses an acute angle ($\beta$) with the plane orthogonal to the axial direction (A).

10. The rolling-member worm drive according to claim 8, wherein the oblique surface is part of a conical surface.

11. The rolling-member worm drive according to claim 8, wherein the oblique surface is provided on the nut element, in the region of a securing groove for accommodation of the securing ring, and cooperates with a chamfered peripheral edge of the securing ring.

12. The rolling-member worm drive according to claim 8, wherein the oblique surface is provided on the securing ring and cooperates with a chamfered edge of the nut element.

13. The rolling-member worm drive according to claim 8, wherein the oblique surface is provided on the nut element, in the region of a securing groove for accommodation of the securing element, and cooperates with a correspondingly inclined oblique countersurface which is formed on the securing ring.

14. A rolling-member worm drive, comprising:

a spindle having an axis (A) and an outer peripheral surface;

a nut element having an inner peripheral surface surrounding said spindle;

at least one nut groove formed in an inner peripheral surface of said nut element and including two end regions and helically running about the axis (A), said nut groove, together with a helical race on said outer peripheral surface of said spindle, defining a helical rolling-member screw path running between the two end regions;

a rolling-member return path running between the two end regions and, together with said rolling-member screw path, constituting a closed rolling-member circulation path;

an endless row of rolling-members arranged in said rolling-member circulation path and lying in said nut groove and on said helical race;

a rolling-member diverting element arranged on said nut element in each of the two end regions for transfer of the rolling-members between said helical rolling-member screw path and said rolling-member return path and between said rolling-member return path and said rolling-member screw path;

at least one of the rolling-member diverting elements being secured on said nut element by means of a securing ring; and said securing ring being a segment spring ring, a securing groove being formed on said nut element for snappingly receiving said securing ring.

15. The rolling-member worm-drive according to claim 14, wherein:

the nut element includes an accommodating recess for the rolling-member diverting element; and the securing groove cuts into said accommodating recess.

16. The rolling-member worm drive according to claim 1 or claim 8, wherein said securing ring is a segment spring ring.

17. The rolling-member worm-drive according to claim 1, 8 or 14, wherein the securing ring is mounted with elastic preload, said preload pressing the rolling-member diverting element against the nut element in axial and/or radial direction.

18. The rolling-member worm-drive according to claim 1, 8, or 14, wherein the securing ring is made of a material which is more resistant to thermal deformation than the material of the rolling-member diverting element.

19. The rolling-member worm-drive according to claim 18, wherein the securing ring is made of metal.

20. The rolling-member worm-drive according to claim 1, 8 or 14 wherein the rolling-member diverting element is made of synthetic material.

21. The rolling-member worm-drive according to claim 1, 8 or 14, wherein:

a recess is formed on the nut element; and the rolling-member diverting element is accommodated in said recess.

22. The rolling-member worm drive according to claim 1, wherein a securing groove is formed on the nut element for snappingly receiving said securing ring.

23. The rolling-member worm-drive according to claim 22, wherein:

the nut element includes an accommodating recess for the rolling-member diverting element; and the securing groove cuts into said accommodating recess.

24. The rolling-member worm-drive according to claim 1, 8 or 14, wherein the rolling-member diverting element has at least one supporting projection pointing substantially in the axial direction (A) of the spindle.

25. The rolling-member worm-drive according to claim 24, wherein the nut element includes at least one supporting recess for the supporting projection.

26. The rolling-member worm drive according to claim 25, wherein said supporting projection form-lockingly engages into said supporting recess.

27. The rolling-member worm-drive according to claim 24, wherein at least one supporting projection at least partially surrounds a rolling-member outlet of the rolling-member diverting element pointing in the axial direction of the spindle.

28. The rolling-member worm-drive according to claim 24, wherein at least one supporting projection is provided which is spaced from a rolling-member outlet of the rolling-member diverting element pointing substantially in the axial direction of the spindle.

29. The rolling-member worm-drive according to claim 24, wherein the at least one supporting projection has a substantially crescent-shaped cross section, taken orthogonal to the axial direction (A).

30. The rolling-member worm-drive according to claim 24, wherein at least two supporting projections are provided.

31. The rolling-member worm-drive according to claim 1, 8 or 14, wherein the rolling-members are balls.

32. The rolling-member worm-drive according to claim 1, 8, 14, wherein a sealing groove for the accommodation of a sealing element is formed on the nut element.

33. The rolling-member worm drive according to claim 1, 8 or 14, wherein the rolling-member diverting element has a rolling-member deflecting nose which facilitates transfer between the rolling-member screw path and the rolling-member return path.

34. The rolling-member worm-drive according to claim 33, wherein the rolling-member deflecting nose is designed as a lubricant wiper and rests on the raceway of the outer peripheral surface of the spindle.

* * * * *

UNITED STATES PATENT AND TRADEMARK OFFICE
CERTIFICATE OF CORRECTION

PATENT NO. : 5,664,459
DATED : September 9, 1997
INVENTOR(S) : Mühleck et al.

It is certified that error appears in the above-indentified patent and that said Letters Patent is hereby corrected as shown below:

Column 3, line 66: "direction" should read --directions--.

Column 5, line 39: "6he" should read --the--.

Column 11, line 34: "wherein that" should read --wherein--.

Column 14, line 23: "14" should read --or 14,--.

Signed and Sealed this

Twelfth Day of May, 1998

Attest:

BRUCE LEHMAN

Attesting Officer

Commissioner of Patents and Trademarks